Aug. 24, 1965  R. E. PERRAULT  3,202,877
PROTECTIVE RELAY FOR POLYPHASE ELECTRICAL APPARATUS
Filed Jan. 27, 1961  2 Sheets-Sheet 1
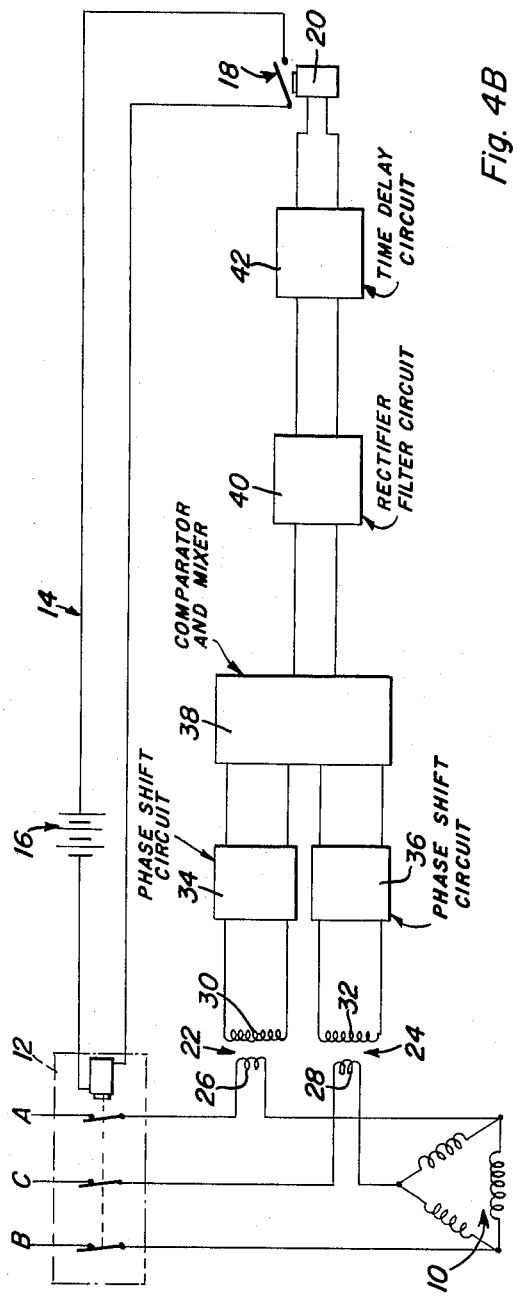
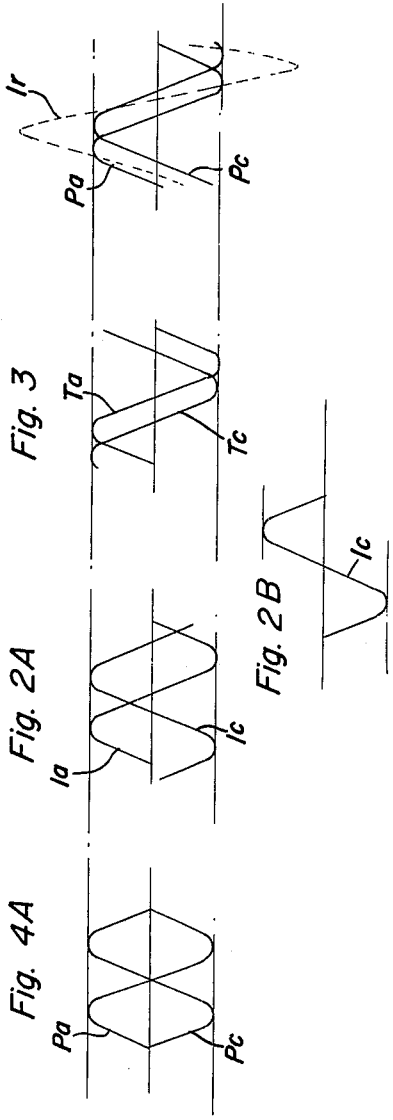
Roy E. Perrault
INVENTOR.
BY *Clarence A.O'Brien*
and *Harvey B. Jacobson*
Attorneys

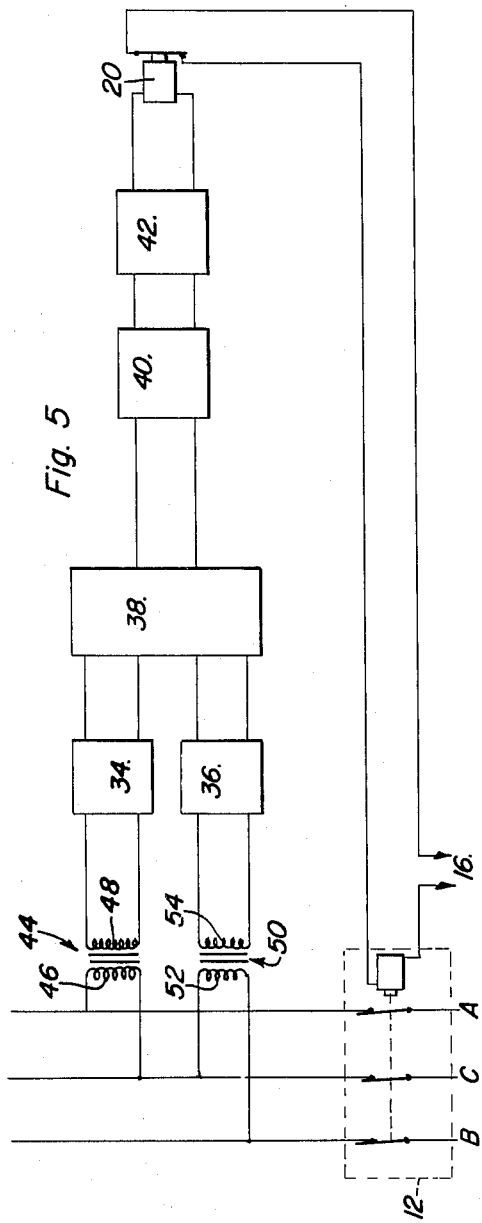
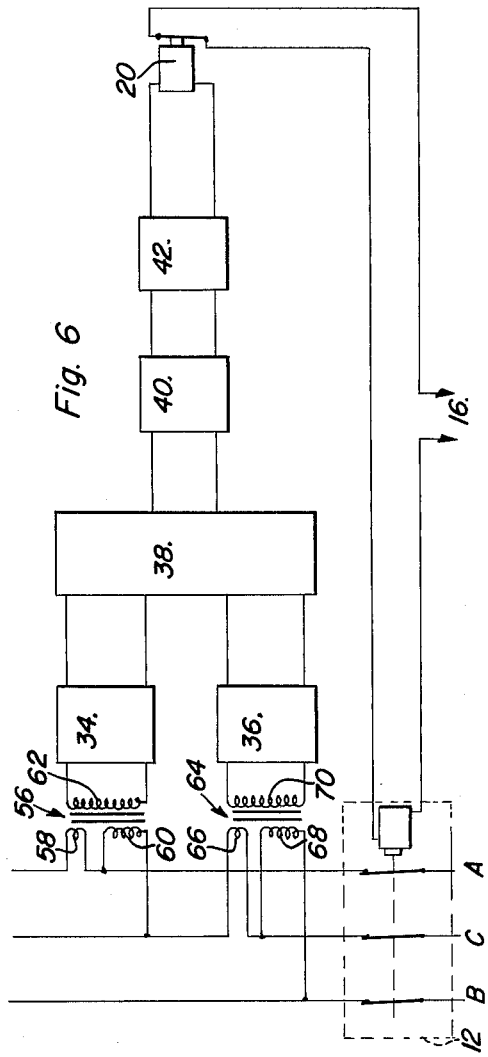
Roy E. Perrault
INVENTOR.

United States Patent Office 3,202,877
Patented Aug. 24, 1965

3,202,877
PROTECTIVE RELAY FOR POLYPHASE
ELECTRICAL APPARATUS
Roy E. Perrault, 905 Westwood Road, Natchez, Miss.
Filed Jan. 27, 1961, Ser. No. 85,308
7 Claims. (Cl. 317—46)

This invention relates to an automatic circuit breaker device for protecting polyphase equipment such as motors, generators, transformers or the like from damage that may occur due to power failure in one or more of the power lines connected to the polyphase equipment.

It is therefore a primary object of this invention to protect polyphase apparatus from damage or burn-out caused by loss of power or unbalanced current therein which would be reflected in the power lines connected to the apparatus.

Another object of this invention is to provide an automatically operative circuit breaker system for disconnecting the power lines from a polyphase A.C. power source in response to power failure, loss of power or unbalanced current in the power lines to which the system responds in a most discriminating manner to provide the desired protection for the polyphase load connected to the power line.

An additional object of this invention is to provide a protective device for polyphase apparatus which is connected to a plurality of A.C. power lines by connecting some of said power lines to transformer means for inducing signal currents that may be compared and cancelled out when the polyphase load is operating under normal condition but which will in response to power failure in any of the lines produce an energizing current for operating a circuit breaker to disconnect all of the power lines from the power source.

The protective device or system of the present invention therefore, involves the connection of transformer primaries to a pair of power lines which are connected to a polyphase load so as to induce in the transformer secondaries out-of-phase voltages which are inverted with respect to each other, the out-of-phase relationship being governed by the out-of-phase balance or unbalanced operating current in the power lines to which the polyphase load is connected. The induced voltages in the transformer secondaries are accordingly connected to the phase shift circuits for the purpose of changing the phase relationship of the induced voltages with respect to each other. The phase relationship under normal operating conditions will be shifted so as to produce in-phase inverted currents which are fed to a balance control circuit for the purpose of combining the current. The resultant current under normal operating conditions will therefore be practically null. However, when power failure or power loss occurs in any one of the power lines, the resultant current produced from the balanced control circuit may be of substantial magnitude so that when it is fed into a rectifier and filter circuit a D.C. energizing current is delivered to a relay for the purpose of opening a control circuit by means of which a circuit breaker is operated to disconnect the power lines from the power source. In order to prevent energization of the relay and operation of the circuit breaker when momentary power loss or failure occurs with immediate restoration of the power, a time delay circuit is interposed between the rectifier and filter circuit and relay.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic diagram of the protective system of the present invention.

FIGURE 2A is a graphical representation of the current characteristics in two of the power lines with which the system of FIGURE 1 is associated, under normal operating conditions.

FIGURE 2B is a graphical representation corresponding to that of FIGURE 2A wherein power failure has occurred in one of the power lines.

FIGURE 3 is a graphical representation of the induced currents under normal operating conditions.

FIGURE 4A is a graphical representation of the phase shifted induced currents under normal operating conditions.

FIGURE 4B is a graphical representation of the phase shifted induced current when power failure occurs in another power line.

FIGURE 5 is one variation from the protective system as illustrated in FIGURE 1.

FIGURE 6 is a second variation from the protective system as illustrated in FIGURE 1.

Referring now to the drawings in detail it will be observed that the system as illustrated in FIGURE 1 is associated with a polyphase load which is diagrammatically illustrated and generally referred to by reference numeral 10. Although a delta-type load is illustrated, it will be appreciated that other types of polyphase loads including Y connections and modifications of either is contemplated. The polyphase load 10 is connected to a plurality of power lines identified as A, B and C which are connected to an A.C. power source. It will be observed that the power line may be disconnected from the power source by a circuit breaker generally referred to by reference numeral 12. It will be apparent therefore, that the protective system will operate through the circuit breaker 12 to disconnect the power source from the load 10 when certain conditions prevail in the power lines.

Circuit breaker 12 is connected to a control circuit generally referred to by reference numeral 14 which may be energized by any suitable power source 16. The control circuit however is normally rendered operative so as to maintain the power lines A, B, and C connected to the source through the circuit breaker 12. A relay switch 18 is accordingly connected in series with the circuit breaker device 12, which switch 18 is normally closed to render the circuit breaker inoperative. A relay device 20 is accordingly provided for opening the switch 18 and thereby render the control circuit 14 operative to operate the circuit breaker 12 for disconnecting the power source from the power lines when the proper conditions prevail. The switch 18 is opened by the relay device 20 in order to trip the circuit breaking apparatus 12. The relay may also have a mechanical lock-out device that would require it to be manually reset after the circuit breaker has been tripped. The relay device 20 itself will be energized for opening the switch 18 by induced current and will not require any outside source of power for its operation.

In order to induce the energizing current that may be available when certain conditions prevail for operating the relay device 20, a pair of positive trip-off current transformer devices generally referred to by reference numeral 22 and 24 are provided. The transformer device 22 includes a primary 26 which is connected into the power line A while the current transformer device 24 includes a primary 28 which is connected into the power line C. The transformer devices respectively include secondaries 30 and 32 through which relative induced current flow occurs in the same phase relationship as the current in the power lines A and C it being recognized of course that the current in each secondary is inverted with respect to the corresponding phase line current in the primary. The secondaries 30 and 32 are respectively connected to phase shift circuits 34 and 36 of any suitable type for the purpose of changing the phase relationship of the currents induced in the secondaries 30 and 32 with respect to each other. The phase shifted induced current are then supplied by the phase shift circuits 34 and 36 to the balance control circuit 38 which combines the phase shifted induced currents to provide a resultant output current which is connected to a rectifier and filter circuit 40. The rectifier and filter circuit will then modify the resultant current from the balance control circuit by passing only a resultant current therefrom of a substantial magnitude (sufficient to warrant operation of the circuit breaker) in the form of a D.C. energizing current which is supplied through the time delay circuit 42 to relay 20. The time delay circuit 42 is provided for the purpose of preventing operation of the relay device 20 if the power failure or loss of power or current unbalance occurring in the load 10 is of a momentary nature. Accordingly, any surge of D.C. energizing current occurring because of momentary power failure which power is immediately restored, will not operate the relay device 20.

Referring now to FIGURE 2A, it will be apparent that the currents $I_a$ and $I_c$ within the power lines A and C will be out of phase with each other by 120° for the usual three phase A.C. power operation of the load 10. This graphical representation of the current flow in the power lines is presumed to exist under normal operating conditions. Referring now to FIGURE 3, it will be observed that the currents $T_a$ and $T_c$ induced in the secondaries 30 and 32 of the transformer devices 22 and 24, respectively, are in the same phase relationship under normal operating conditions as the currents in the power line A and C as described in FIGURE 2A. The induced current $T_c$ is however phase shifted by 120° with respect to the induced current $T_a$ as hereinbefore indicated. Referring now to FIGURE 4A, it will be observed that the induced current $P_a$ and $P_c$ are in phase opposition to each other or inverted with respect to each other by virtue of the phase shift effect of the phase shift circuit 34 and 36. Accordingly, the phase shift induced currents $P_a$ and $P_c$ when combined with each other by the balance control circuit will produce a zero resultant current. Such will be the case under normal operating conditions. However, should there be a power failure for example in the power line A, only the primary 28 of the transformer device 24 will be provided with a current $I_c$ as indicated in FIGURE 2B. Accordingly, the output from the balance control circuit 38 will be a substantial induced current which when rectified by the rectifier and filter circuit 40 will provide an energizing D.C. current for the relay device 20 which in turn will open the switch 18 to thereby trip circuit breaker 12 and disconnect the power source from the power lines.

A similar circuit breaking condition will prevail should there be a power line failure in the power line C.

If a power line failure should occur however in power line B, it will be appreciated that a single phase current will exist in the power lines A and C so as to induce in the secondaries 30 and 32 of the transformer devices current in phase opposition which would be shifted out of phase by the phase shift circuit 34 and 36 as illustrated in FIGURE 4B. The balance control circuit will accordingly produce a resultant current $I_r$ of substantial magnitude as illustrated in FIGURE 4B. Accordingly, the relay device 20 will be energized by virtue of the resultant current as hereinbefore indicated.

Referring now to FIGURE 5, a variation of the system as described with respect to FIGURE 1 is illustrated. The system of FIGURE 5 is similar in all respects to the system of FIGURE 1 except for the type and connection of the transformer devices. Accordingly in FIGURE 5, a potential transformer device 44 is provided and includes a primary 46 connected across power lines A and C for inducing a current in the secondary 48 thereof. A second potential transformer device 50 is provided including a primary 52 connected across the power lines B and C for inducing current in the secondary 54. It will be appreciated therefore that the secondaries of the transformer devices 44 and 50 will have induced thereacross, voltages which are out of phase with each other so as to operate the protective system in a manner similar to that described with respect to FIGURE 1. The advantage of using potential transformers instead of the current transformers of the FIGURE 1 system, is the self-starting attribute of potential transformers which would be important when the line voltages are restored after a phase failure.

In FIGURE 6 a second variation of the system of FIGURE 1 is illustrated which variation also relates to the transformer devices. The system of FIGURE 6 therefore, includes a transformer device 56 which includes a first current primary 58 connected in the power line A and a second potential primary 60 connected across the power lines A and C. The primaries 58 and 60 accordingly induce a voltage across the secondary 62. The second transformer device 64 similarly includes a first current primary 66 connected in the power lines C and a second potential primary 68 connected across the power lines C and B. The primaries 66 and 68 accordingly induce a voltage across the secondary 70. The induced voltages in the secondaries 62 and 70 will also be out-of-phase with each other and hence be operative on the protective system in a manner similar to that described with respect to FIGURE 1. In the case of FIGURE 6 system, the transformer devices will have both the self-starting advantages of a potential transformer and the positive trip-off attribute of the current transformers of FIGURE 1. This latter embodiment of the invention would accordingly be ideal for remote polyphase load installation in which the polyphase equipment will be unattended.

From the foregoing description, operation and utility of the protective relay systems of the present invention will be apparent. It will therefore be appreciated that a highly effective and automatic device is provided for use with polyphase equipment that will prevent damage thereto without any unnecessary power cut-off resulting from non-damaging operating variations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic protective device for a polyphase load having more than two power lines connected thereto comprising, transformer means operatively interconnecting different pairs of the power lines for inducing inverted currents representing the same power function associated with the respective power lines, phase shift means operatively connected to the transformer means to shift said induced currents into phase opposition under normal polyphase operation of the load, balance control means operatively connected to the phase shift means for combining said phase shifted induced currents into a resultant current approaching zero under normal operating conditions, rectifier and filter means operatively connected to the balance control means for converting any excessive resultant current into an energizing current, relay means operatively connected to said rectifier and filter means for energization by an energizing current therefrom, control circuit means rendered operative in response to energization of said relay means and circuit breaker means operatively connected to said power lines and controlled by the control circuit means for disconnecting the power lines when the control circuit means is rendered operative.

2. The combination of claim 1 wherein said transformer means includes a pair of current transformers having primary coils in two of the power lines and secondary coils for conducting currents representing polyphase line currents as the induced therein power functions.

3. The combination of claim 1, wherein said transformer means includes a pair of potential transformers having primary coils connected across different pairs of power lines and secondary coils for conducting currents induced therein representing polyphase voltages as the power functions.

4. The combination of claim 1, wherein said transformer means includes first line current responsive primary means connected in one of the power lines, second voltage responsive primary means connected across a pair of power lines including said one power line and secondary means in which the inverted currents are induced by the first and second primary means.

5. The combination of claim 1 including time delay circuit means operatively interconnecting the rectifier and filter means to the relay means for preventing energization of the relay means by any surge of current due to momentary power failures.

6. In combination with a polyphase circuit having at least three power lines for conducting out-of-phase line currents, a protective device comprising, stationary transformer means for producing signals representative of phase relationships between power transmitted in all but one of said power lines, signal controlled circuit means for detecting deviations from a predetermined phase relationship between said power lines, and circuit breaker means responsive to detection of said deviations by said signal controlled circuit means for interrupting supply of power to said power lines, said signal controlled circuit means comprising phase shifter means connected to the stationary transformer means for shifting said phase signals produced by the transformer means into phase opposition to each other only when said phase currents are in said predetermined out-of-phase relationship, signal balancing means connected to the phase shifter means for producing an energizing current in response to deviation of the shifted phase signals from phase opposition to each other, and time delay means operatively connecting said signal balancing means to the circuit breaker means for passage of energizing current thereto only if persisting beyond a minimum duration.

7. In combination with a polyphase power supply having three power lines conducting out-of-phase currents to a load, a protective system comprising a circuit breaker operative when energized to simultaneously interrupt flow of phase current in the respective power lines, a pair of signal transformers connected to said power lines for producing signal current representative of the power transmitted through the respective power lines and the phase relationship therebetween, each of said signal transformers including a secondary winding and a primary winding assembly having a current section and a voltage section, the current sections of the primary winding assemblies being connected in two of said power lines in series with the load, the voltage section of one of said primary winding assemblies being connected across said two of the power lines, the voltage section of the other of said primary winding assemblies being connected across a third of said power lines and one of said two power lines, a pair of phase shifter devices respectively connected to the secondary windings of the signal transformers for shifting the signal currents induced in the secondary windings into phase opposition to each other when a predetermined phase relationship exists between the power transmitted by said power lines, a signal balancing circuit connected to said phase shifter devices for developing an energizing current in response to deviation of said phase shifted signal currents from phase opposition to each other, signal delay means operatively connecting the signal balancing circuit to the circuit breaker for energization thereof by said energizing current when the phase shifted signal currents deviate from phase opposition for a period exceeding a minimum duration.

References Cited by the Examiner

UNITED STATES PATENTS

| | | | |
|---|---|---|---|
| 1,620,556 | 3/27 | Jones | 317—46 |
| 1,674,477 | 6/28 | May | 317—27 |
| 1,776,130 | 9/30 | Petch | 317—27 |
| 2,508,198 | 5/50 | Sonnemann | 317—27 |
| 2,953,722 | 9/60 | Willis | 317—36 |
| 2,997,510 | 3/61 | Adamson | 317—36 |
| 3,048,745 | 8/62 | Warrington | 317—27 |

SAMUEL BERNSTEIN, *Primary Examiner.*